(12) United States Patent
Summerlot et al.

(10) Patent No.: US 9,354,327 B1
(45) Date of Patent: May 31, 2016

(54) RADIATION DETECTION PACKAGE

(71) Applicant: Lockheed Martin Corporation, Bethesda, MD (US)

(72) Inventors: David P. Summerlot, Orlando, FL (US); Matthew W. Kelley, Orlando, FL (US); Joseph M. Turchiano, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 357 days.

(21) Appl. No.: 14/161,005

(22) Filed: Jan. 22, 2014

(51) Int. Cl.
*G01T 1/105* (2006.01)
*G01T 1/06* (2006.01)
*C03C 4/12* (2006.01)
*G01T 1/10* (2006.01)
*C03C 4/00* (2006.01)

(52) U.S. Cl.
CPC .............. *G01T 1/105* (2013.01); *C03C 4/0078* (2013.01); *C03C 4/12* (2013.01); *G01T 1/06* (2013.01); *G01T 1/10* (2013.01); *Y10S 204/901* (2013.01)

(58) Field of Classification Search
CPC ............. G01T 1/105; G01T 1/06; G01T 1/10; C03C 4/0078; C03C 4/12; Y10S 204/901
See application file for complete search history.

(56) References Cited

U.S. PATENT DOCUMENTS 3,093,734 A * 6/1963 Just .............................. 250/365
4,204,976 A * 5/1980 Jahn et al. ............... 252/301.4 P
4,489,240 A * 12/1984 Kronenberg et al. ...... 250/474.1
6,041,150 A * 3/2000 Hasing ...................... G01T 1/06 385/12
2004/0149921 A1 * 8/2004 Smyk ............................ 250/372
2012/0018652 A1 * 1/2012 Yoder et al. ................ 250/484.2
2013/0341514 A1 * 12/2013 Akselrod et al. ............ 250/362

FOREIGN PATENT DOCUMENTS

WO    WO 9919746 A1 *  4/1999  ................ G01T 1/10

OTHER PUBLICATIONS

Google Translate, Translation of "Messwertaufbereitung Schaltung", obtained Jul. 8, 2015 at https://translate.google.com.*
Beckers WO 99/19746 A1 English Translation, Google Patents translation from German, obtained Jul. 8, 2015 at https://www.google.com/patents/WO1999019746A1, Google Patents, pp. 1-12.*

(Continued)

*Primary Examiner* — David Porta
*Assistant Examiner* — Jeremy S Valentiner
(74) *Attorney, Agent, or Firm* — Withrow & Terranova, PLLC

(57) ABSTRACT

Radiation detection is disclosed. A radiation detection package includes a radio-photoluminescent glass (RPLG), an EMR source and a photodetector. The EMR source includes an input lead, and is configured to emit first energy in a predetermined band of EMR in a downstream direction toward the RPLG in response to receipt of an input signal on the input lead of the EMR source. The photodetector has an output lead, and is configured to detect second energy that is emitted by the RPLG in an emission band of EMR in response to the receipt of the first energy in the predetermined band of EMR, and generate a first output signal on the output lead indicative of an amount of the second energy.

26 Claims, 8 Drawing Sheets

(56) References Cited

OTHER PUBLICATIONS

Huang, David Y.C. et al., "Radio-Photoluminescence Glass Dosimeter (RPLGD)," Advances in Cancer Therapy, Nov. 2011, InTech, http://www.intechopen.com/books/advances-in-cancer-therapy/radio-photoluminescence-glass-dosimeterrplgd, pp. 553-568.

Miyamoto, Y. et al., "Optical properties in Ag+-doped phosphate glass irradiated with X-rays and α-particles," Radiation Measurements, 2012, http://dx.doi.org/10.1016/j.radmeas.2012.10.018, Elsevier, 3 pages.

Miyamoto, Y. et al., "Radiophotoluminescence from silver-doped phosphate glass," Radiation Measurements, vol. 46, Issue 12, Dec. 2011, Elsevier Ltd., pp. 1480-1483.

Rah, Jeong-Eun et al., "Clinical application of glass dosimeter for in vivo dose measurements of total body irradiation treatment technique," Radiation Measurements, vol. 46, Issue 1, Jan. 2011, Elsevier Ltd., pp. 40-45.

\* cited by examiner

RADIATION DETECTION PACKAGE

TECHNICAL FIELD

The embodiments relate generally to radiation dosimeters, and in particular, to a radiation detection package that senses ionizing radiation when in an unpowered state.

BACKGROUND

Ionizing radiation is any electromagnetic radiation with sufficient energy to free an electron from a molecule or an atom. Electronic devices may absorb ionizing radiation under a variety of conditions and circumstances. Electronic devices that are routinely elevated to high altitudes, such as electronic circuitry found in airplanes, rockets, missiles, space vehicles, and the like, are exposed to relatively high levels of ionizing radiation due to the thinner atmosphere at higher altitudes. On the ground, electronic devices may be analyzed for security purposes by equipment that emit X-rays, such as may be done at an import port or an airport, to ensure that undesirable materials are not surreptitiously being brought into a country or carried on an airliner, in a CONEX or an ISO container, or in a semi-trailer. Electronic devices may even be exposed to X-rays by individuals attempting to determine the contents of a container for purposes of theft.

Any electronic device may be negatively impacted after being exposed to a sufficient amount of ionizing radiation. Exposure to ionizing radiation can result in a variety of problems, including memory soft errors, such as a value of one or zero being temporarily changed, complementary metal-oxide semiconductor latchups, frequency changes of oscillators, which can in turn lead to timing issues, shifts in mean output voltage of low-dropout regulators, and the like.

Unfortunately, most radiation detectors capable of detecting ionizing radiation must be powered in order to do so. However, electronic devices are often unpowered, such as in the situations described above, during the periods of time the electronic devices are exposed to such ionizing radiation. Consequently, such electronic devices may unknowingly be powered up after suffering damage from ionizing radiation, and be expected to operate, and instead fail to operate, or fail to operate properly. In some electronic devices, like the electronics on a missile guidance system, failure to operate can be catastrophic.

Those electronic devices that are capable of detecting ionizing radiation in an unpowered state have substantial disadvantages. For example, dye-based dosimeters are relatively inexpensive but are incapable of being queried electronically, and metal oxide semiconductor field effect transitor-based dosimeters are prohibitively expensive and not readily available as a commercial off-the-shelf product.

SUMMARY

The present embodiments are directed to a radiation detection package (RDP) capable of sensing ionizing radiation when in an unpowered state. The RDP stores the dosage of ionizing radiation that occurs over a period of time. When the RDP is powered, a quantity of ionizing radiation to which the RDP has been exposed can be determined, and, if desired, an action is taken. The action may comprise, for example, the issuance of an alert, the halting of subsequent processing, or any other desirable event or sequence of events.

In one embodiment, a method for detecting ionizing radiation is provided. An electromagnetic radiation (EMR) source receives a first input signal on an EMR input lead. In response to the receipt of the first input signal, the EMR source emits first energy in a predetermined band of EMR in a downstream direction toward a radio-photoluminescent glass (RPLG) that is fixed with respect to the EMR source. A photodetector is fixed with respect to the RPLG and has a photodetector output lead. The photodetector receives a second input signal, and in response, detects second energy that is emitted by the RPLG in an emission band of EMR in response to the receipt of the first energy in the predetermined band of EMR. In one embodiment, the first input signal and the second input signal are the same input signal.

In another embodiment, an RDP is provided. The RDP includes an RPLG, and an EMR source comprising an input lead. The EMR source is configured to emit first energy in a predetermined band of EMR in a downstream direction toward the RPLG in response to the receipt of an input signal on the input lead. The RDP also includes a photodetector that has an output lead. The photodetector is configured to detect second energy emitted by the RPLG in an emission band of EMR in response to the receipt of the first energy in the predetermined band of EMR, and generate a first output signal on the output lead indicative of an amount of the second energy.

In one embodiment, the RDP includes a comparator that is configured to receive the first output signal, compare the first output signal to a threshold value, and based on the comparison, output a second output signal indicative of an ionizing radiation dosage absorbed by the RPLG.

In another embodiment, the RDP includes a programmable circuit. The programmable circuit is configured to receive the first output signal, and perform an action based on a comparison between the first output signal and at least one predetermined value. In one embodiment, the at least one predetermined value comprises a lookup table comprising a plurality of predetermined values. The programmable circuit is configured to perform a particular action of a plurality of actions based on a particular predetermined value of the plurality of predetermined values.

In one embodiment, the RDP includes a reflector. The RPLG has a first side and a second side, and the EMR source and the photodetector are positioned with respect to the first side of the RPLG. The reflector is positioned with respect to the second side of the RPLG. The EMR source is configured to emit the first energy in the predetermined band of EMR in the downstream direction toward the first side of the RPLG. The reflector is further configured to reflect energy emitted from the second side by the RPLG in response to the first energy emitted in the downstream direction toward a different portion of the second side of the RPLG, and back through the RPLG in the downstream direction toward the photodetector.

In another embodiment, a printed circuit board (PCB) is provided. The PCB includes a plurality of RDPs coupled to a surface of the PCB. The RDPs are located at different respective locations on the surface of the PCB, and each RDP comprises an RPLG, an EMR source and a photodetector. The EMR source comprises an input lead, and is configured to emit first energy in a predetermined band of EMR in a downstream direction toward the RPLG in response to receipt of an input signal on the input lead. The photodetector has an output lead, and is configured to detect second energy that is emitted by the RPLG in an emission band of EMR in response to the receipt of the first energy in the predetermined band of EMR. The photodetector is also configured to generate an output signal on the output lead indicative of an amount of the second energy. The PCB includes a processor that comprises a controller coupled to the plurality of RDPs. The controller is configured to receive the output signal from each of the plurality of RDPs, and make a determination that the output signal from any of the plurality of RDPs exceeds a predetermined threshold value.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first energy" and "second energy," and the ordinal does not imply a priority, a type, an importance, or other attribute, unless otherwise stated herein. The phrase "band" as used herein refers to one wavelength, or a range of consecutive wavelengths.

Figure 1:
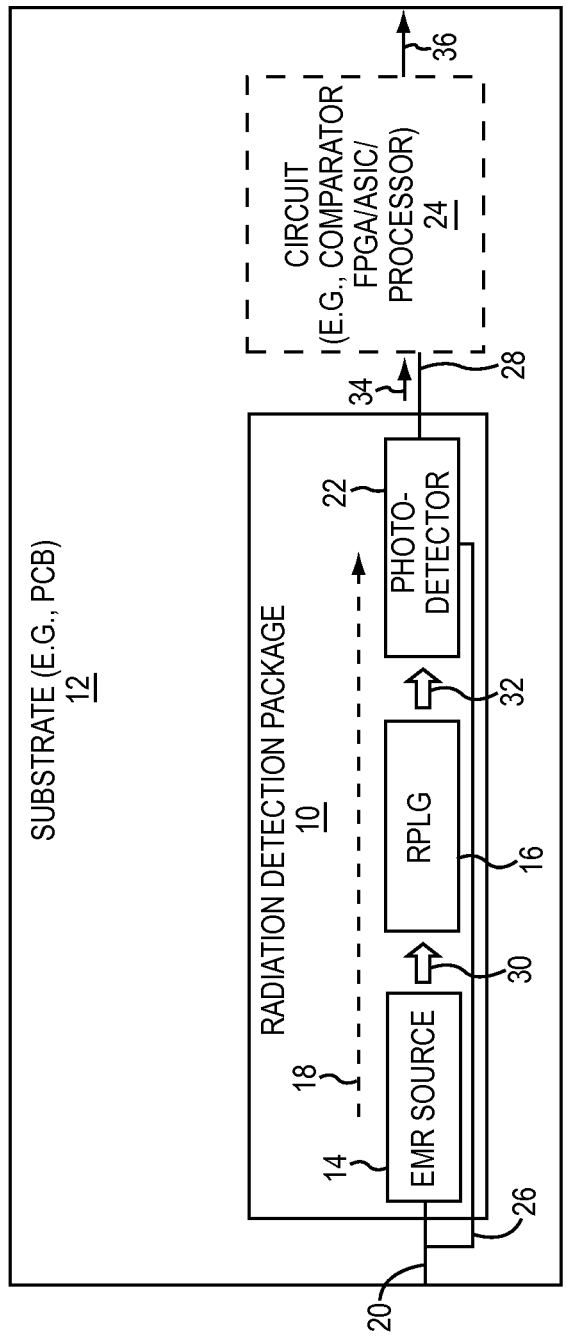
FIG. 1 is a block diagram of a radiation detection package (RDP) according to one embodiment.

FIG. 1 is a block diagram illustrating a radiation detection package (RDP) 10 according to one embodiment. In this embodiment, the RDP 10 is mounted with respect to a substrate 12, which may comprise, for example, an organic, glass, or ceramic printed circuit board (PCB), or an interposer board, or any other suitable surface to which the RDP 10 may be mounted. In practice, the substrate 12 would typically have other components mounted thereon, one or more of which may be communicatively coupled to the RDP 10, but for purposes of illustration such other components are not shown. The RDP 10 includes an EMR source 14, which may comprise any device capable of emitting energy in the form of EMR, in a desired, or predetermined, band, or bands, of EMR. In one embodiment, the EMR source 14 comprises an ultraviolet (UV) light-emitting diode (LED).

The RDP 10 also includes a radio-photoluminescent glass (RPLG) 16 positioned in a downstream direction 18 from the EMR source 14. The RPLG 16 may be fixed with respect to the EMR source 14. The RPLG 16 comprises a material, such as silver, that, when exposed to ionizing radiation changes form. In one embodiment, the RPLG 16 comprises a silver-doped phosphate glass. In such embodiment, the RPLG 16 may be doped with $Ag^+$ ions. Electron hole pairs may be formed when the RPLG 16 is exposed to ionizing radiation. Electrons may be captured by $Ag^+$ ions to form $Ag^0$ ions. Electron hole pairs may migrate to the $Ag^+$ ions to form $Ag^{2+}$ ions. $Ag^0$ and $Ag^{2+}$ ions both act as centers of luminescence in the RPLG 16. Such centers of luminescence may then be utilized, as described in greater detail herein, to determine a dosage of ionizing radiation absorbed by the RPLG 16. The RPLG 16 may have any of a number of different geometries, depending on the particular implementation of the RDP 10. The EMR source 14 includes an input lead 20 which may be used to provide power to the EMR source 14. The input lead 20 may also be referred to as the EMR input lead 20 to distinguish the input lead 20 from input leads to other components.

The RDP 10 also includes a photodetector 22 that is positioned in the downstream direction 18 with respect to the RPLG 16. In some embodiments, the photodetector 22 may be coupled to a circuit 24, which may comprise, for example, a relatively simple circuit, such as a comparator, or a programmable circuit, such as a field-programmable gate array (FPGA), application-specific integrated circuit (ASIC), or processor. The photodetector 22 may be fixed with respect to the EMR source 14 and the RPLG 16. In some embodiments, an input lead 26 provides an input signal, such as a power signal, to the photodetector 22. In other embodiments, such as when the photodetector 22 is being used in a photovoltaic mode, the photodetector 22 may not need an input lead. The input lead 26 may also be referred to as the photodetector input lead 26 to distinguish the input lead 26 from other input leads, such as the EMR input lead 20. The input leads 20, 26 may receive power from a common signal such that the EMR source 14 and the photodetector 22 are powered substantially concurrently, or may receive power at different times, such that the EMR source 14 may be first powered, followed by the photodetector 22. The photodetector 22 may also have a photodetector output lead 28 for sending output signals to another component, such as the circuit 24.

Figure 2:
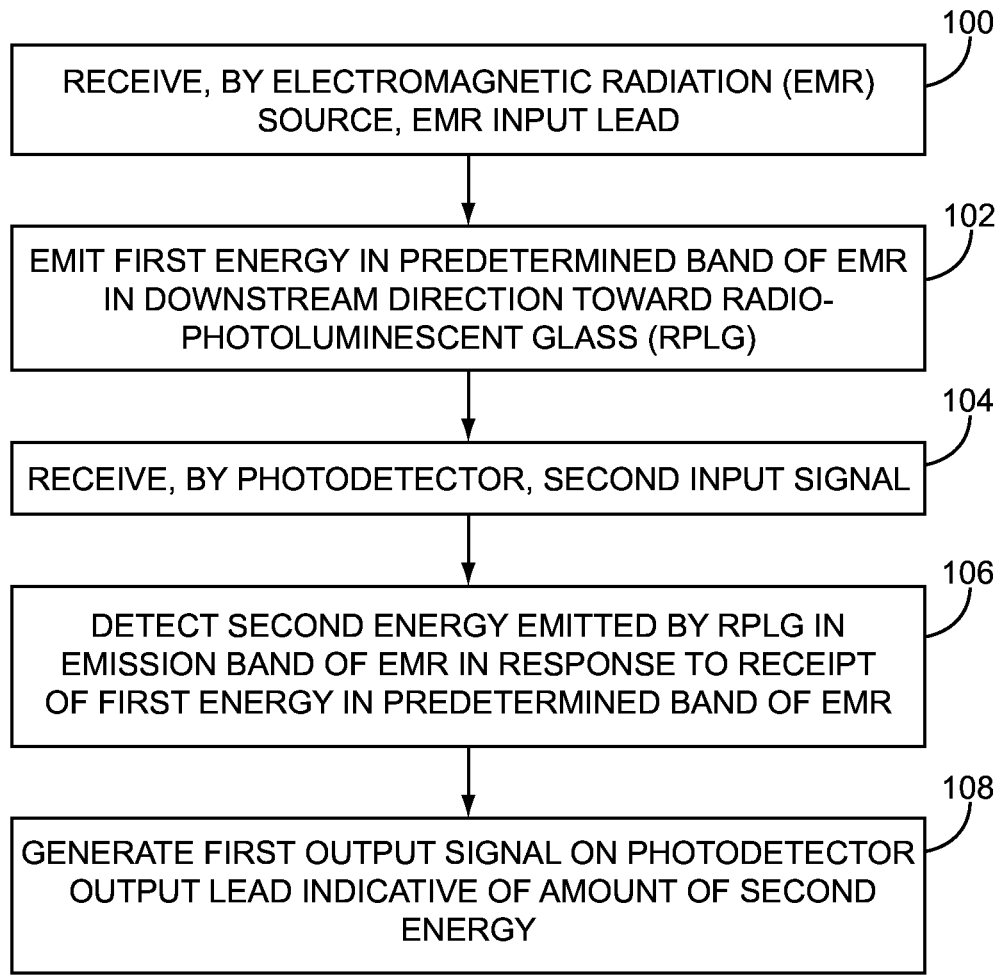
FIG. 2 is a flowchart illustrating a method for detecting ionizing radiation according to one embodiment.

FIG. 2 is a flowchart illustrating a method for detecting ionizing radiation according to one embodiment. FIG. 2 will be discussed in conjunction with FIG. 1. The RDP 10 receives a first input signal, which may comprise, for example, a power signal, on the input lead 20 (FIG. 2, block 100). In response, the EMR source 14 emits first energy 30 in a predetermined band of EMR in the downstream direction 18 toward the RPLG 16 (FIG. 2, block 102). The predetermined band of EMR emitted by the EMR source 14 may differ depending on a number of criteria, including the particular composition of the RPLG 16, the particular band of ionizing radiation of interest, or the like. Once selected, the predetermined band of EMR may then be implemented through selection of the appropriate EMR source 14. In one embodiment, the predetermined band of EMR is in the UV band, and the EMR source 14 is a UV LED. In some embodiments, the predetermined band of EMR may comprise a UV band of wavelengths centered about a 295 nanometer (nm) wavelength, a UV band of wavelengths centered about a 365 nm wavelength, or a UV band of wavelengths centered about a 318 nm wavelength, although the embodiments are not limited to any particular band of EMR.

In response to receipt of the first energy 30 in the predetermined band of EMR, the RPLG 16 may emit second energy 32 in one or more different emission bands of EMR. One emission band of EMR may comprise the same band of EMR as the predetermined band of EMR received from the EMR source 14. In particular, the RPLG 16 will receive the first energy 30 in the predetermined band of EMR that was emitted by the UV LED, and will emit any non-absorbed portion of such first energy 30 as second energy 32 in an emission band of EMR that is the same band of EMR as the predetermined band of EMR. In such embodiment, the second energy 32 emitted by the RPLG 16 may be less than the amount of first energy 30 received, because the RPLG 16 may absorb some of the first energy 30 in the predetermined band of EMR. For example, in the example discussed above where the RPLG 16 comprises silver-doped phosphate glass, the centers of luminescence formed by $Ag^0$ and $Ag^{2+}$ ions in response to the receipt of ionizing radiation may absorb a quantity of the first energy 30 received from the EMR source 14. As will be discussed in greater detail herein, the difference between the amount of the first energy 30 emitted by the EMR source 14 in the predetermined band of EMR, and the amount of second energy 32 emitted by the RPLG 16 in the predetermined band of EMR may be used to quantify a dosage of ionizing radiation received by the RPLG 16.

The RPLG 16 may also, in response to the receipt of the first energy 30, emit the second energy 32 in an emission band of EMR that comprises a visible band of EMR. For example, the centers of luminescence formed by $Ag^0$ and $Ag^{2+}$ ions in response to the receipt of ionizing radiation may fluoresce in a particular visible band of EMR, such as orange light, upon the receipt of the first energy 30 in the predetermined band of EMR from the EMR source 14. As discussed above with respect to the emission of the second energy 32 in the predetermined band of EMR by the RPLG 16, the amount of second energy 32 emitted by the RPLG 16 in the particular visible band of EMR may also be used to quantify a dosage of ionizing radiation received by the RPLG 16.

Assume, in this embodiment, that the photodetector 22 has the input lead 26, and receives a second input signal, such as a power signal, on the photodetector input lead 26 (FIG. 2, block 104). The second input signal may be the same input signal as the first input signal received by the EMR source 14 on the EMR input lead 20, or may be a different input signal. In particular, the photodetector 22 may be powered in parallel with the EMR source 14, or may be powered subsequently to powering the EMR source 14 to, for example, allow the output of the EMR source 14 to first stabilize. The photodetector 22 detects the second energy 32 emitted by the RPLG 16 (FIG. 2, block 106). In one embodiment, the emission band of EMR of the second energy 32 is the same EMR band as the predetermined band of EMR of the first energy 30. In another embodiment, the emission band of EMR of the second energy 32 is a visible band of EMR that is emitted by the centers of luminescence formed in the RPLG 16 after the receipt of ionizing radiation. Energy emitted by the RPLG 16 other than the second energy 32 may, in some embodiments, be filtered out prior to receipt by the photodetector 22, or the photodetector 22 may be designed with detector elements that are sensitive only in the emission band of EMR of the second energy 32. The photodetector 22 generates a first output signal 34 on the photodetector output lead 28 that is indicative of an amount of the second energy 32 detected by the photodetector 22 (FIG. 2, block 108). The first output signal 34 may comprise an electrical signal.

The first output signal 34 is received by the circuit 24. The circuit 24 may comprise, for example, a relatively simple circuit, such as a comparator, that compares the first output signal 34 to a threshold value, and based on the comparison, sends a second output signal 36 indicative of an ionizing radiation dosage absorbed by the RPLG 16. The second output signal 36 may, in this embodiment, be a simple high or low voltage signal that identifies the result of the comparison of the first output signal 34 to the threshold value.

The threshold value may be determined, for example, based on various criteria, such as the particular composition of the RPLG 16, the output of the EMR source 14, characteristics of the photodetector 22, and an amount of ionizing radiation which is identified as being in excess of an acceptable dosage of ionizing radiation. The second output signal 36 may be utilized to perform any desired action, such as generating and sending an alert to a display device (not illustrated), halting subsequent processing, changing a flag in a logfile for further analysis, performing additional diagnostics, or the like.

In other embodiments, the circuit 24 may comprise a programmable circuit, such as, by way of non-limiting example, a programmable logic controller (PLD), a complex PLD (CPLD), an FPGA, an ASIC, or a general purpose processor that executes complex software instructions to implement the desired functionality. In such embodiment, the circuit 24 may be a separate programmable circuit from a main or primary processor associated with the substrate 12, or may be the primary processor associated with the substrate 12 that executes complex software instructions to implement the desired functionality. For example, a circuit 24 may be programmed to power the RDP 10, during initialization, and receive the first output signal 34 directly from the photodetector 22, or from circuitry coupled to the photodetector 22 and to the circuit 24, such as analog-to-digital conversion circuitry, one or more comparators, and the like. The circuit 24 may then perform one or more actions based on the first output signal 34 signal. In one embodiment, the circuit 24 may monitor and track the ionizing radiation dosage over time.

Figure 3:
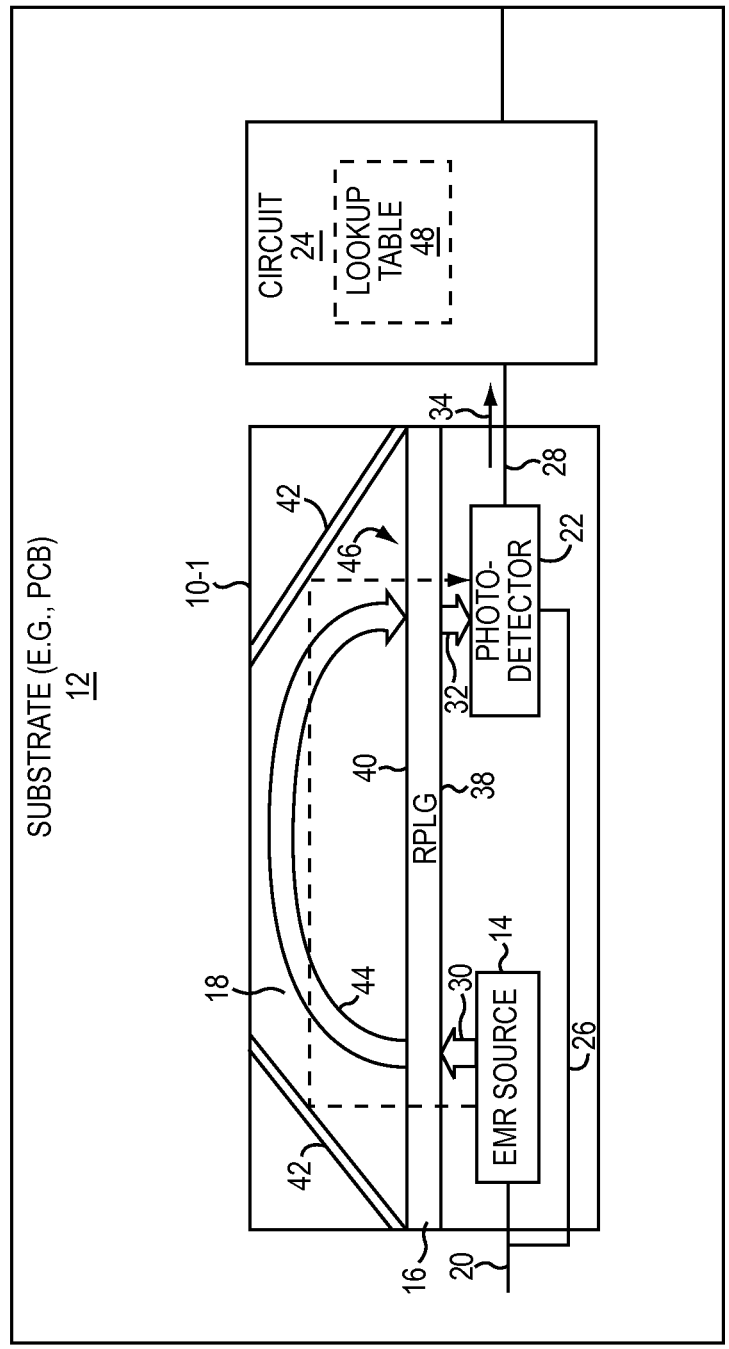
FIG. 3 is a block diagram of an RDP according to another embodiment.

FIG. 3 is a block diagram of an RDP 10-1 according to another embodiment. In this embodiment, the energy emitted by the EMR source 14 is passed through the RPLG 16 multiple times before being detected by the photodetector 22. The RPLG 16 has a first side 38 and a second side 40. The EMR source 14 and the photodetector 22 are positioned with respect to the first side 38 of the RPLG 16. The EMR source 14 and/or the photodetector 22 may abut the first side 38 of the RPLG 16, or as illustrated, may be positioned a distance away from the first side 38 of the RPLG 16. One or more reflectors 42 are positioned with respect to the second side 40 of the RPLG 16.

In operation, the EMR source 14 receives an input signal on the input lead 20, and in response, emits first energy 30 in the predetermined band of EMR toward the first side 38 of the RPLG 16. The RPLG 16 receives the first energy 30, and emits remaining first energy 44 in the downstream direction 18. The reflectors 42 are configured to reflect the remaining first energy 44 emitted from the second side 40 toward a different portion 46 of the second side 40 of the RPLG 16, and back through the RPLG 16 toward the photodetector 22. The RPLG 16 receives the remaining first energy 44, and emits second energy 32 toward the photodetector 22. The first energy 30 has thus been absorbed twice by the RPLG 16, and the second energy 32 represents the remaining amount of unabsorbed energy. Passing the energy emitted by the EMR source 14 in the predetermined band of EMR through the RPLG 16 multiple times in this manner increases the path through the RPLG 16, such that additional optical centers are stimulated for greater sensitivity and signal-to-noise ratio than would be for a single pass. This may also reduce the amount of material needed for the RPLG 16, as well as reduce the overall volume of the RDP 10-1.

While not illustrated in all of the embodiments discussed herein, EMR shielding suitable for blocking EMR in the predetermined band of EMR emitted by the EMR source 14 may be suitably positioned to inhibit the first energy 30 from being directly received by the photodetector 22. Moreover, while the RPLG 16 is illustrated as a single component for the purposes of illustration, it is apparent that the RPLG 16 may comprise multiple separate components.

In some embodiments, the circuit 24 may include a memory that includes a lookup table 48 that is used by the circuit 24 to perform a particular action of a plurality of different potential actions. Specifically, the lookup table 48 may comprise a plurality of entries, each entry comprising a predetermined value that identifies a dosage of ionizing radiation, and each corresponding to a different action. The circuit 24 may, based on the first output signal 34, determine that the dosage of ionizing radiation received by the RPLG 16 corresponds to a particular entry in the lookup table 48, and then perform the action that corresponds to that particular entry. By way of non-limiting example, an ionizing radiation dosage less than a first dosage identified by an entry in the lookup table 48 may result in no action being performed. An ionizing radiation dosage greater than the first dosage but less than a second dosage identified by an entry in the lookup table 48 may result in a flag being set in a logfile, which may be used, for example, to perform subsequent diagnostics on the substrate 12. An ionizing radiation dosage greater than the second dosage but less than a third dosage identified by an entry in the lookup table 48 may result in diagnostics being immediately performed, or in an alert being sent to an operator. An ionizing radiation dosage greater than the third dosage may result in the halting of subsequent processing. It will be appreciated that these are merely examples of potential actions, and that any desired actions may be performed based on determined dosages.

Figure 4:
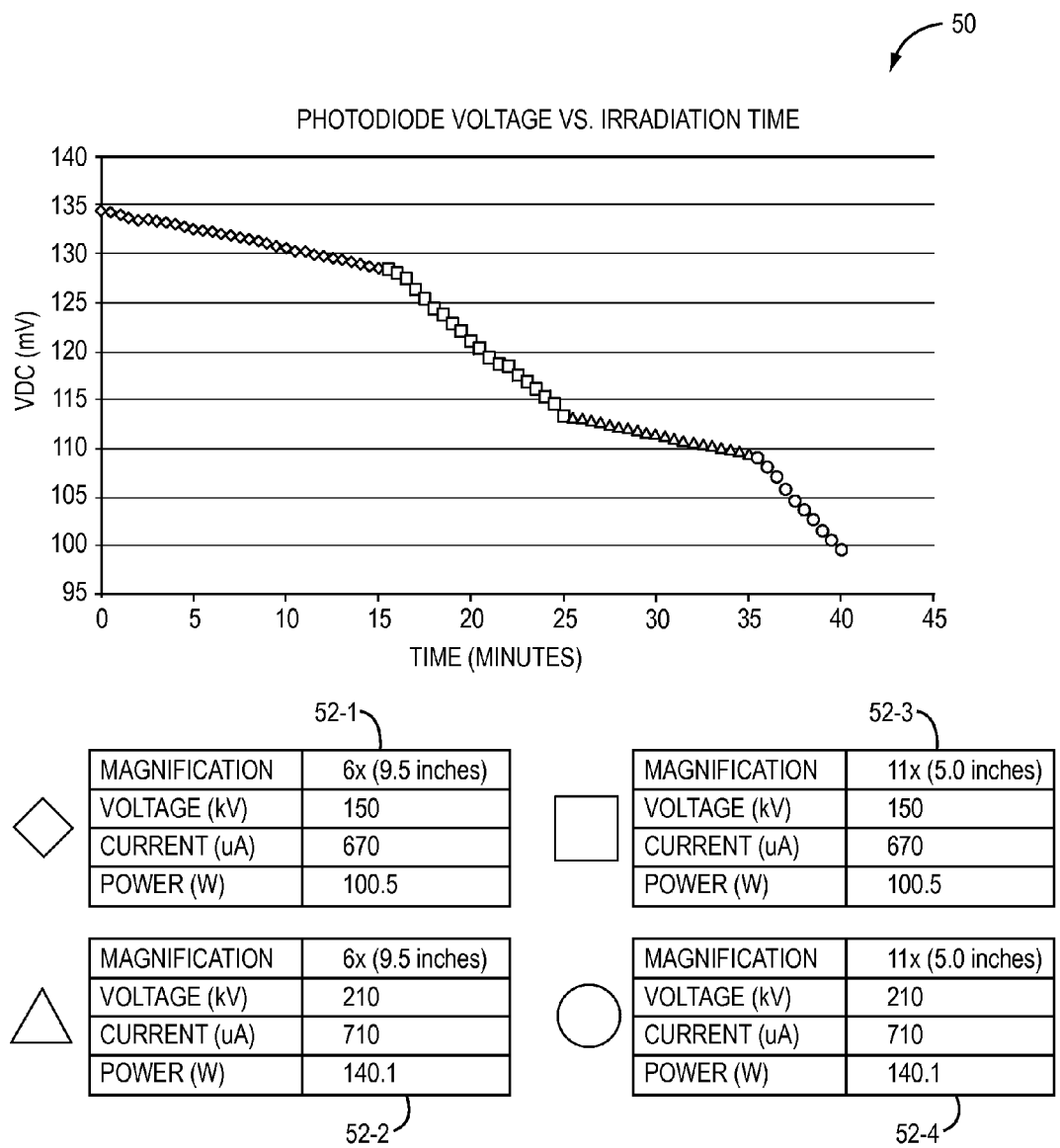
FIG. 4 is a graph illustrating a relationship between output voltage that is output by a photodetector as a first signal based on an ionizing radiation dosage received by radio-photoluminescent glass (RPLG) for different amounts of ionizing energy.

FIG. 4 is a graph 50 illustrating a relationship between an output voltage that is output by the photodetector 22 as the first output signal 34 based on an ionizing radiation dosage received by the RPLG 16 for amounts of ionizing energy, as set forth below the graph 50 in tables 52-1-52-4. In this embodiment, the second energy 32 comprises the same band of EMR as the predetermined band of EMR of the first energy 30. Thus, the output of the photodetector 22 decreases as a function of the ionizing radiation dosage, due to the increased absorption of the first energy 30 by the RPLG 16 as the ionizing radiation dosage increases. While the graph 50 is merely an example, the graph 50 illustrates a mechanism by which one or more appropriate threshold values may be determined for measurement with respect to the first output signal 34 to determine an ionizing radiation dosage.

Figure 5:
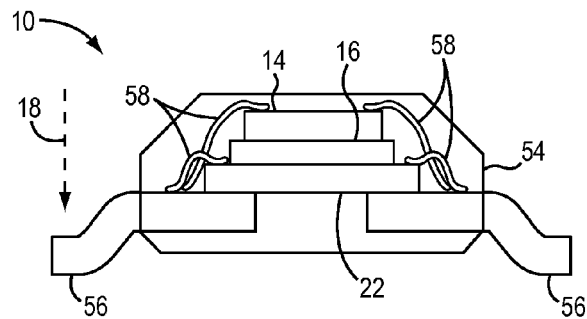
FIG. 5 is a block diagram of a surface mount technology embodiment of the RDP, according to one embodiment.

The RDP 10 may be packaged in any of several different manners. FIG. 5 is a block diagram of a surface mount technology (SMT) embodiment of the RDP 10. In this embodiment the RPLG 16 may be sandwiched between the EMR source 14 and the photodetector 22. In particular, the RPLG 16 may have a first substantially planar surface that abuts a substantially planar surface of the EMR source 14, and a second substantially planar surface that abuts a substantially planar surface of the photodetector 22. The RDP 10 may include a protective coating 54 that surrounds, or substantially surrounds the EMR source 14, the RPLG 16, and the photodetector 22. The RDP 10 may have a plurality of leads 56 which may be coupled, via wires 58, to the EMR source 14 and the photodetector 22 to implement the input leads 20, 26 and the output lead 28.

Figure 6:
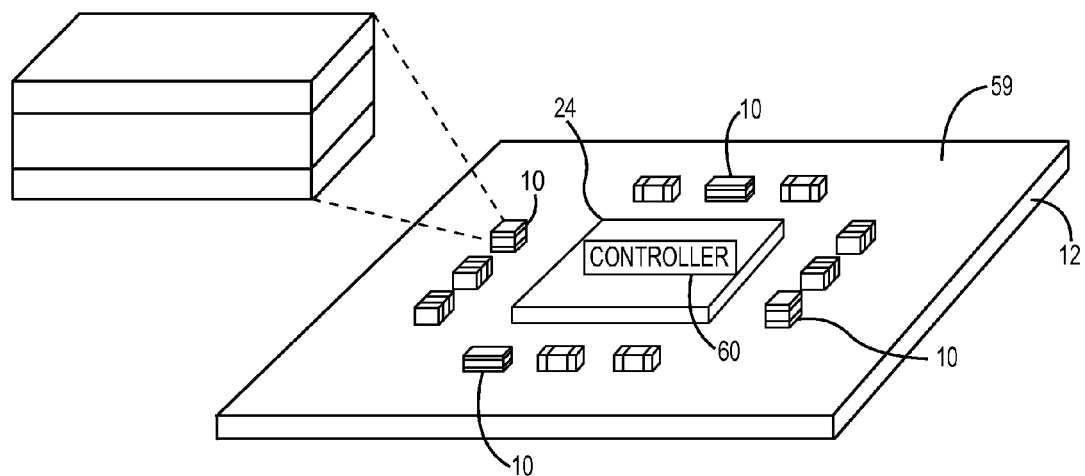
FIG. 6 a block diagram of a substrate on which a plurality of RDPs have been positioned about a surface of the substrate.

FIG. 6 is a block diagram of a substrate 12 on which a plurality of RDPs 10 have been positioned about a surface 59 of the substrate 12. In this embodiment, the RDPs 10 may, for example, be in the form of an SMT component, and/or in a form of a decoupling capacitor. The circuit 24 may be the primary processor on the substrate 12, and as part of an initialization routine, a controller function 60 may activate each of the RDPs 10 and receive a corresponding first output signal 34 (FIG. 1) from each RDP 10. Based on the first output signals 34, the controller function 60 may determine that one or more of the first output signals 34 exceeds a predetermined threshold value, and take a desired action. Alternatively, as discussed above with regard to FIG. 3, the controller function 60 may access the lookup table 48, and based on a maximum dosage of ionizing radiation indicated by any of the plurality of RDPs 10, identify an entry in the lookup table 48, and perform a particular action that corresponds to that entry. The use of multiple RDPs 10, among other advantages, may be useful in detecting very focused ionizing radiation that may have impacted one portion of the substrate 12, but not other portions of the substrate 12. The use of multiple RDPs 10 may also be useful in detecting ionizing radiation that may have been partially blocked by other components, and thus, was not received by certain of the RDPs 10, but which was received by others of the RDPs 10.

Figure 7:
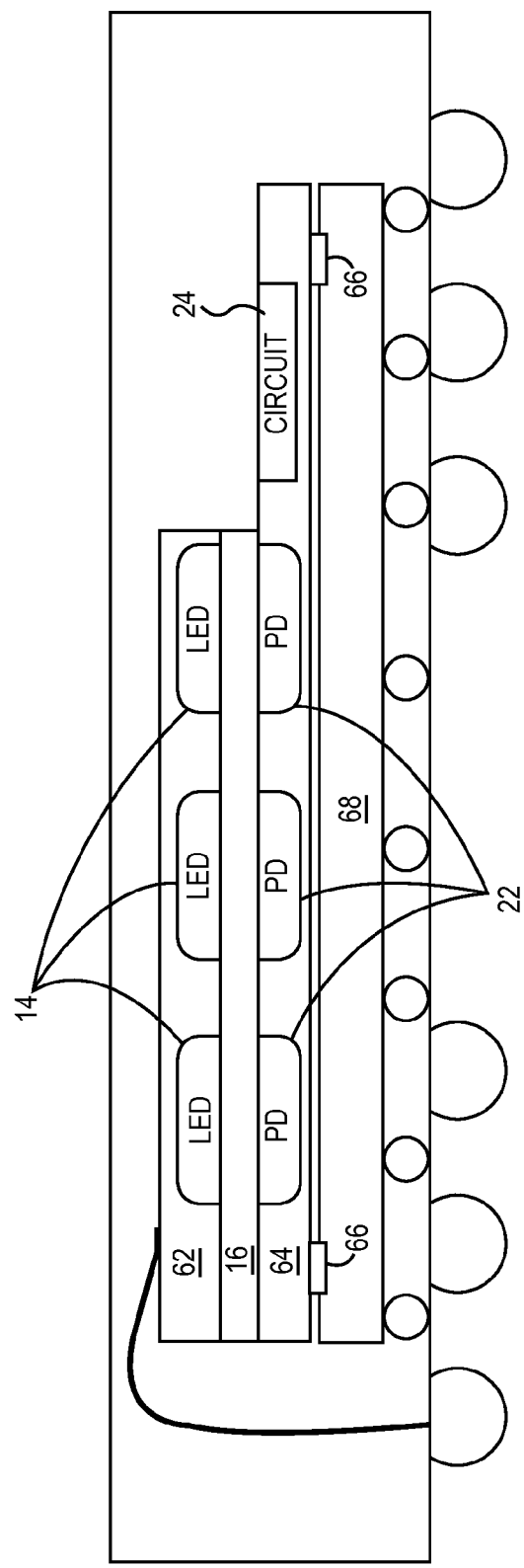
FIG. 7 is a block diagram of a stacked integrated circuit RDP according to one embodiment.

FIG. 7 is a block diagram of a stacked integrated circuit (IC) RDP 10 according to one embodiment, wherein the RDP 10 is packaged with a primary processor. The RDP 10 includes a sapphire substrate 62 in which a plurality of EMR sources 14, in this example UV LEDs, have been formed. An RPLG 16 is sandwiched between the sapphire substrate 62 and a plurality of photodetectors 22 have been formed in a silicon substrate 64. The RDP 10 may be coupled by one or more through-silicon vias 66 to a primary processor 68. In some embodiments, the RDP 10 may utilize a digital SPI/I²C interface. The RDP 10 may also be wire bonded to an interposer in one embodiment. The primary processor 68 may, in some embodiments, implement the circuit 24 as well as provide any other desired functionality for a system.

Figure 8:
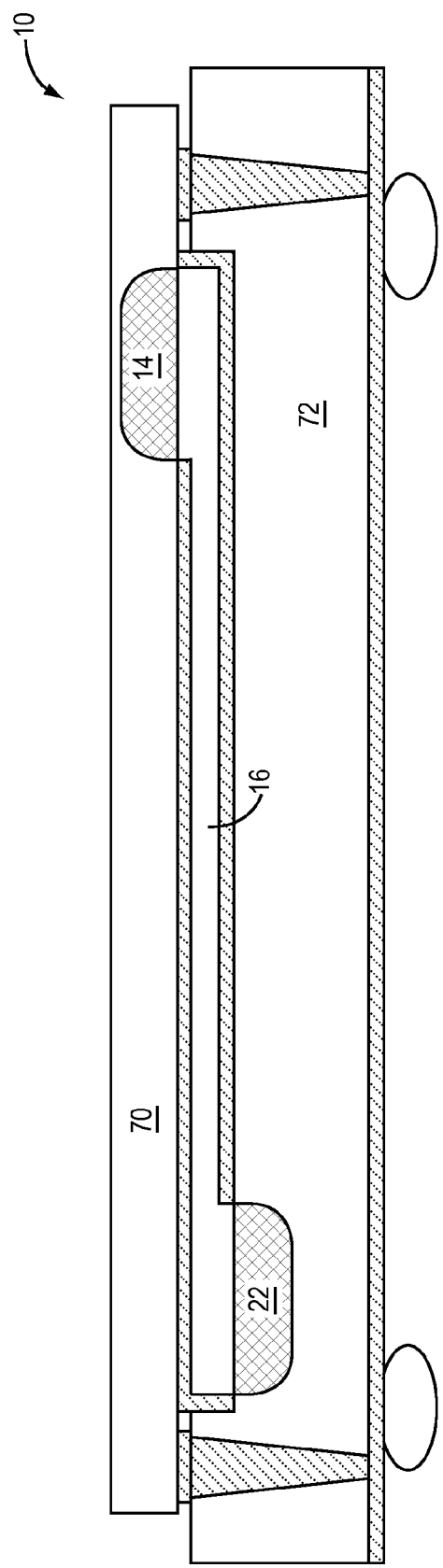
FIG. 8 is a block diagram of an RDP wherein the RPLG is in the form of a waveguide, according to one embodiment.

FIG. 8 is a block diagram of an RDP 10 according to another embodiment. In this embodiment, the EMR source 14 is formed in a sapphire substrate 70. The RPLG 16 is in the form of a waveguide, and may be formed, for example, utilizing a low melt point glass and/or spin-on material dispersed with RPLG particles. The increased path of the first energy 30 through the RPLG 16 improves sensitivity. The RPLG 16 may be bonded to the sapphire substrate 70 and the silicon substrate 72. The photodetectors 22 may comprise one or more p-n photodiodes formed during IC fabrication in a silicon substrate 72.

Figure 9:
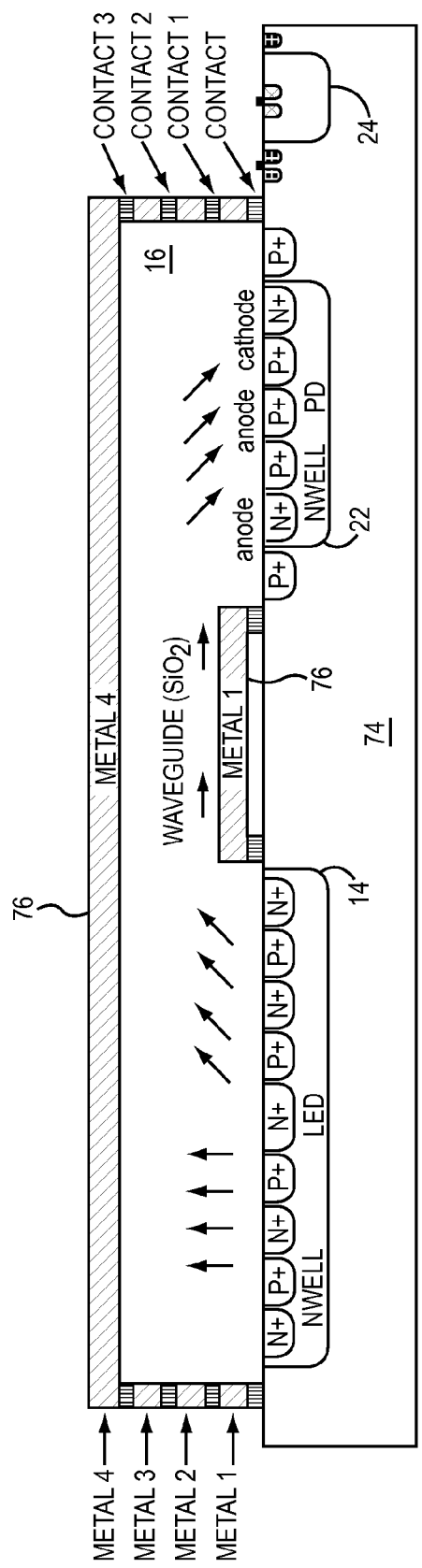
FIG. 9 is a block diagram illustrating another embodiment wherein the RPLG is in the form of a waveguide.

FIG. 9 is a block diagram illustrating another embodiment wherein the RPLG 16 is in the form of a waveguide. In this embodiment, the EMR source 14 and the photodetector 22 are formed in a silicon substrate 74. The RPLG 16 comprises silicon dioxide and includes RPLG particles, such as silver-doped phosphate glass. Metalized layers 76 may act as a cladding material.

FIGS. 5-9 illustrate certain non-limiting packaging embodiments of the RDP 10, but the embodiments are not limited to such examples, and the RDP 10 may be manufactured and packaged in any desirable manner. In some embodiments, the EMR source 14, such as a UV LED, may be flip chipped or wire bonded to a sensing substrate that contains one or more photodetectors 22. Such EMR sources 14 may, for example, include III-V materials, such as indium gallium arsenide, aluminum gallium nitride, and the like. In some embodiments, the RPLG 16 may be manufactured by grinding silver-doped RPLG materials, or the like, and combining such materials with low-melt glass. In some embodiments, a spin-on RPLG material can be formed in a photo-imageable organic matrix.

Among other advantages, the embodiments provide a relatively low-cost radiation detection device that can be queried electronically.

Those skilled in the art will recognize improvements and modifications to the preferred embodiments of the present disclosure. All such improvements and modifications are considered within the scope of the concepts disclosed herein and the claims that follow.

What is claimed is:

1. A radiation detection package (RDP) comprising:
   a radio-photoluminescent glass (RPLG);
   an electromagnetic radiation (EMR) source comprising an input lead, and configured to emit first energy in a predetermined ultraviolet (UV) band of EMR in a downstream direction toward the RPLG in response to receipt of an input signal on the input lead of the EMR source; and
   a photodetector having an output lead, and configured to detect second energy that is emitted by the RPLG in a UV emission band of EMR in response to the receipt of the first energy in the predetermined UV band of EMR, and generate a first output signal on the output lead indicative of an amount of the second energy.

2. The RDP of claim 1, wherein the photodetector further comprises an input lead, and upon receipt of an input signal on the input lead of the photodetector, detects the second energy.

3. The RDP of claim 1, wherein the RPLG comprises silver-doped phosphate glass.

4. The RDP of claim 1, wherein the RPLG has a first substantially planar surface that abuts a substantially planar surface of the EMR source, and a second substantially planar surface that abuts a substantially planar surface of the photodetector.

5. The RDP of claim 1, wherein the RPLG, the EMR source and the photodetector are fixed with respect to one another.

6. The RDP of claim 1, further comprising a substrate, and wherein the RPLG, the EMR source and the photodetector are fixed with respect to the substrate.

7. The RDP of claim 1, further comprising a comparator configured to:
   receive the first output signal;
   compare the first output signal to a threshold value; and
   based on the comparison, output a second output signal indicative of an ionizing radiation dosage absorbed by the RPLG.

8. The RDP of claim 7, wherein the second output signal indicates an excess ionizing radiation dosage by one of a high voltage and a low voltage.

9. The RDP of claim 1, comprising a programmable circuit configured to:
   receive the first output signal; and
   perform an action based on a comparison between the first output signal and at least one predetermined value.

10. The RDP of claim 9, wherein at least one predetermined value is a threshold value.

11. The RDP of claim 9, wherein the at least one predetermined value comprises a lookup table comprising a plurality of predetermined values, and further comprising:
    performing the action from a plurality of actions based on a particular predetermined value of the plurality of predetermined values.

12. The RDP of claim 11, wherein the action comprises halting subsequent processing.

13. The RDP of claim 11, wherein the action comprises initiating an alert identifying an ionizing radiation dosage.

14. The RDP of claim 9, wherein the programmable circuit comprises one of a field-programmable gate array, an application-specific integrated circuit, and a processor.

15. The RDP of claim 1, further comprising:
    a reflector; and wherein:
    the RPLG has a first side and a second side;
    the EMR source and the photodetector are positioned with respect to the first side of the RPLG;
    the reflector is positioned with respect to the second side of the RPLG;
    the EMR source is configured to emit the first energy in the predetermined UV band of EMR in the downstream direction toward the first side of the RPLG; and
    the reflector is configured to reflect energy emitted from the second side by the RPLG in response to the first energy in the downstream direction toward a different portion of the second side of the RPLG and back through the RPLG in the downstream direction toward the photodetector.

16. The RDP of claim 1, wherein the UV emission band of EMR is the same band as the predetermined UV band of EMR.

17. The RDP of claim 1, wherein the UV band of EMR comprises a band of EMR centered about one of a 295 nanometer (nm) wavelength, a 318 nm wavelength, and a 365 nm wavelength.

18. The RDP of claim 1, wherein the RPLG, the EMR, and the photodetector are disposed in a semiconductor package.

19. A printed circuit board (PCB), comprising:
    a plurality of radiation detection packages coupled to a surface of the PCB, the plurality of radiation detection packages located at different respective locations on the surface of the PCB, each radiation detection package comprising:
      a radio-photoluminescent glass (RPLG);
      an electromagnetic radiation (EMR) source comprising an input lead, and configured to emit first energy in a predetermined ultraviolet (UV) band of EMR in a downstream direction toward the RPLG in response to receipt of an input signal on the input lead of the EMR source; and
      a photodetector having an output lead, and configured to detect second energy that is emitted by the RPLG in a UV emission band of EMR in response to the receipt of the first energy in the predetermined UV band of EMR, and generate a first output signal on the output lead indicative of an amount of the second energy; and
    a processor comprising a controller coupled to the plurality of radiation detection packages, and configured to:
      receive the output signal from each of the plurality of radiation detection packages; and make a determination that the output signal from any of the plurality of radiation detection packages exceeds a predetermined threshold value.

20. A method, comprising:

receiving, by an electromagnetic (EMR) source, a first input signal on an EMR input lead;

in response to receipt of the first input signal, emitting first energy in a predetermined ultraviolet (UV) band of EMR in a downstream direction toward a radio-photoluminescent glass (RPLG) that is fixed with respect to the EMR source;

receiving, by a photodetector fixed with respect to the RPLG and having a photodetector output lead, a second input signal;

detecting, by the photodetector, second energy that is emitted by the RPLG in an a UV emission band of EMR in response to the receipt of the first energy in the predetermined UV band of EMR; and emitting, by the photodetector, a first output signal on the photodetector output lead indicative of an amount of the second energy.

21. The method of claim 20, wherein the first input signal and the second input signal comprise the same input signal.

22. The method of claim 20, further comprising:

receiving, by circuitry, the first output signal; and comparing the first output signal to a threshold value to determine a condition.

23. The method of claim 22, wherein the condition is indicative of an ionizing radiation dosage absorbed by the RPLG.

24. A radiation detection package (RDP) comprising:

a radio-photoluminescent glass (RPLG);

an electromagnetic radiation (EMR) source comprising an input lead, and configured to emit first energy in a predetermined band of EMR in a downstream direction toward the RPLG in response to receipt of an input signal on the input lead of the EMR source;

a photodetector having an output lead, and configured to detect second energy that is emitted by the RPLG in an emission band of EMR in response to the receipt of the first energy in the predetermined band of EMR, and generate a first output signal on the output lead indicative of an amount of the second energy; and a reflector; and wherein:

the RPLG has a first side and a second side;

the EMR source and the photodetector are positioned with respect to the first side of the RPLG;

the reflector is positioned with respect to the second side of the RPLG;

the EMR source is configured to emit the first energy in the predetermined UV band of EMR in the downstream direction toward the first side of the RPLG; and the reflector is configured to reflect energy emitted from the second side by the RPLG in response to the first energy in the downstream direction toward a different portion of the second side of the RPLG and back through the RPLG in the downstream direction toward the photodetector.

25. The RDP of claim 24, wherein the emission band of EMR comprises a visible light band of EMR.

26. The RDP of claim 24, wherein the predetermined band of EMR comprises an ultraviolet (UV) band of EMR and the emission band of EMR comprises a visible light band of EMR.

* * * * *